Aug. 18, 1964     D. G. GUMPERTZ     3,144,958
AUTOMATIC WAREHOUSING MACHINE
Original Filed May 5, 1958     5 Sheets-Sheet 1

INVENTOR.
DONALD G. GUMPERTZ
BY
Christie, Parker & Hale
ATTORNEYS

Aug. 18, 1964

D. G. GUMPERTZ 3,144,958

AUTOMATIC WAREHOUSING MACHINE

Original Filed May 5, 1958

INVENTOR.
DONALD G. GUMPERTZ
BY Christie, Parker & Hale
ATTORNEYS

United States Patent Office 3,144,958
Patented Aug. 18, 1964

3,144,958
AUTOMATIC WAREHOUSING MACHINE
Donald G. Gumpertz, 4217 Navajo St.,
North Hollywood, Calif.
Continuation of application Ser. No. 732,968, May 5,
1958. This application Sept. 4, 1962, Ser. No. 222,758
14 Claims. (Cl. 221—7)

This invention relates to automatic merchandising machinery, and more particularly is concerned with a machine for automatically filling orders calling for selected quantities of different items stored in a warehouse or the like. This application is a continuation of application Serial No. 732,968, filed May 5, 1958, now abandoned.

Merchandising in some fields requires the handling of a large number of items of stock, as, for example, the wholesale drug business, the grocery business, the automotive replacement parts business, and the like. The wholesale merchandising problem in each of these types of business is quite similar in that orders must be filled from a large number of different items with relatively few numbers of each item. It has been the practice to store these items in numbered bins in a warehouse and have individuals, called stockpickers, fill an order by going around and extracting the required number of each item from the appropriate bins to assemble all the required items in a given order.

Various machines have heretofore been proposed for selecting and transporting items from stock to a common assembly point. Such known systems are subject to one or more of the following objections. They may be designed for a very special type of merchandising and are not adaptable to more general application; they may be suitable for dispensing only a limited number of different items; they may be too slow to be of practical value in assembling a large number of different items.

Considering the advantages of the present invention over automatic merchandising systems heretofore proposed, it is important to bear in mind that each merchandising situation presents its own problems. The present invention is particularly suited to an operation in which a very large number of different items of relatively small numbers of each item is required. The present invention is particularly directed to the selection problem and is capable of selecting from several thousand items. The greater the number of items involved, the greater the savings effected by the machine over manual selection. The machine of the present invention is arranged to be expanded to handle an almost unlimited number of different items without increasing substantially the complexity of the machine and without affecting the overall speed of operation. The significant aspect of the operation of the present invention is that the time required to fill an order is substantially independent of the number of different items called for in the order.

This is accomplished in the present invention by a parallel type of dispensing operation, that is, a dispensing operation in which one of every item in a given order is dispensed simultaneously and conveyed to an order assembly point. In subsequent cycles of operation, the machine dispenses one of every item on the order of which two are required, then every item on a given order of which three are required, etc., until the required number of every item on the order is dispensed. The total time required to dispense a complete order is therefore determined in large part by the maximum number of units of any item in a pariticular order.

In brief, the merchandising machine mechanically comprises a plurality of dispensing mechanisms which may be each electrically actuated to dispense one of an item stored in a particular dispensing mechanism. A transportation system involving an arrangement of conveyor belts conveys each of the items dispensed to a preselected one of a number of order assembly points. An automatically controlled gating arrangement directs a group of dispensed items associated with a given order to a desired order assembly point, so that a number of order assembly points may be provided as required for continuous dispensing of items from successive orders.

Electrical control of the dispensing mechanisms according to the items and quantities listed in a given order is provided, which preferably operates from information stored on punched cards. A group of punched cards representing the items and quantities of each item in an order are read into a memory in the control unit, each of the items and quantities being stored in a binary-coded decimal form in the memory. The coded information is serially read out and used to prime the appropriate dispensing mechanisms associated with the items stored in memory. At the same time, a comparison of the number of a given item already dispensed with the required quantity of that item is made and the priming of the mechanism inhibited if the required number has already been dispensed. The primed dispensing mechanisms are then energized to simultaneously dispense one of each of the items in memory of which the desired quantity has not already been dispensed in previous cycles of memory readout.

For a more complete understanding of the invention, reference should be had to the accompanying drawings, wherein.

Figures 1, 2:
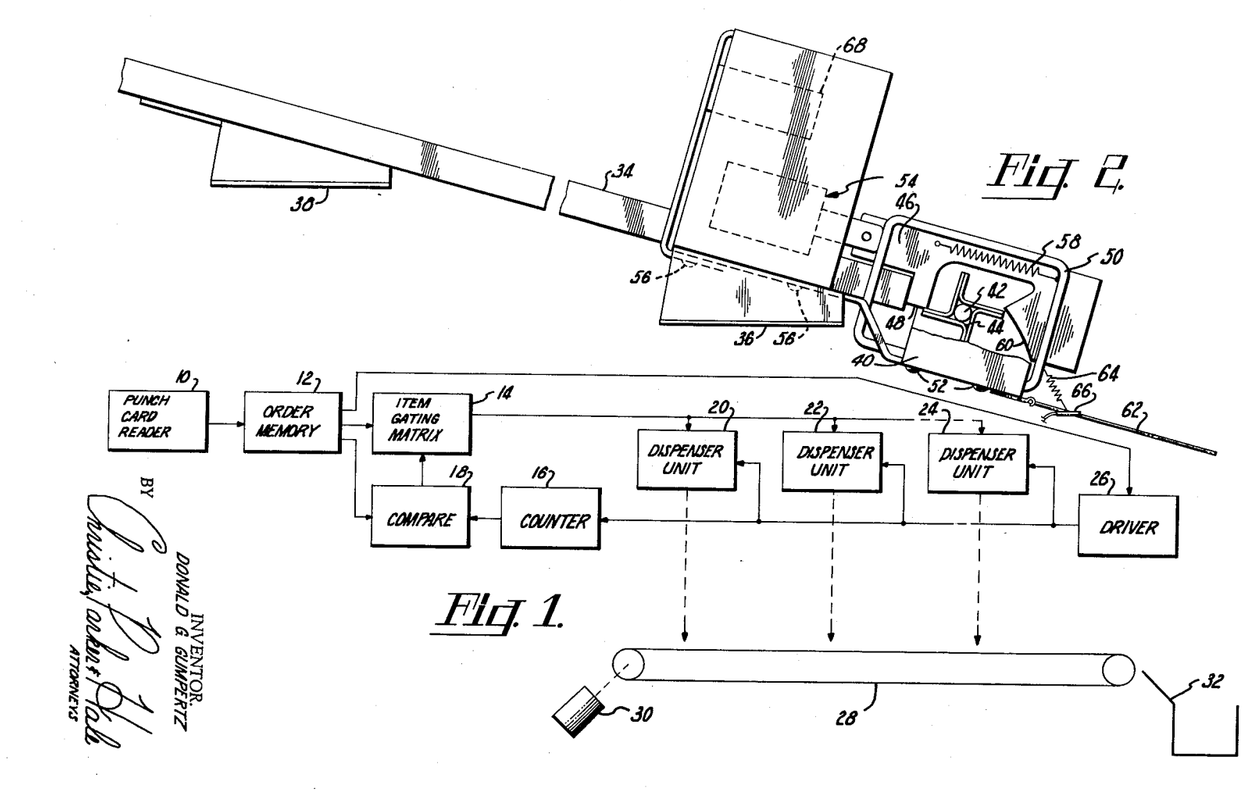
FIG. 1 is a simplified schematic block diagram of the control circuit for the dispensing units.
FIG. 2 is a side elevational view partly in section, showing details of one of the dispensing units.

Referring to the schematic block diagram of FIG. 1, there is shown a simplified merchandise dispensing system incorporating the parallel dispensing feature of the present invention. In this figure, the numeral 10 indicates generally an information source in which is stored information in coded form identifying the items and quantity of each item to be dispensed per order. The information source may be a punched paper tape reader, a magnetic tape reader, or other such device. For purposes of illustration and by way of example only, the information source 10 is shown as a punch card reader, such as the IBM 416 machine. These punch cards and machines for reading out digital information from such cards are well known. For example, see Patent No. 2,718,356. Each order as it is loaded into the punch card reader 10 comprises a deck of punched cards all punched with the same account number. Each card has an item number and a quantity number punched in appropriate columns on the card.

All the cards in one order are read out by the card reader 10 into an order memory circuit 12 which may include a magnetic drum where the item numbers and quantity numbers for one order can be stored and read out repeatedly. The item numbers and associated quantity numbers are read out of the order memory 12 in serial fashion. By suitable converter means, the item numbers are arranged to prime corresponding gates in an item-gating matrix 14. After each item number primes a corresponding gate in the matrix 14, the quantity number is compared with a number stored in the counter 16 by means of a comparison circuit 18. If the quantity number is less than the number stored in the counter 16, the comparator circuit 18 puts out a pulse which is passed by the particular gates in the matrix 14 which have been gated on by the item numbers read out of memory.

Associated with the output of each gate in the matrix 14 is a dispenser unit, three of which are indicated at 20, 22, and 24. The pulse passed by a particular gate in the item matrix 14 from the comparator circuit 18 goes to an associated one of the dispenser units, the pulse priming the dispenser unit so that it can be energized from a driver circuit 26. The driver 26 is actuated by the order memory circuit 12 at the end of one complete readout of an order stored in the memory. At this time all the appropriate dispenser units will have been primed according to the items stored in memory. When the driver is triggered, the primed dispenser units are actuated for dispensing one item from each of the dispenser units. The dispensed items drop down onto a conveyor belt 28 driven by a motor 30 in conventional manner and are transported to an order collecting chute 32 for packaging and shipping to the customer.

Every time the driver 26 actuates the primed dispenser units, it advances the counter 16. The order memory is then caused to read out the order a second time. Any item calling for a quantity of one will not produce a pulse at the output of the comparator circuit 18 during the second readout of the order from the memory 12. Only items having a quantity of two or greater will produce an output pulse from the comparator 18 for priming the appropriate dispenser units. The order is read out of memory 12 as many times as required and a quantity comparison made so as to ultimately dispense the largest quantity of any one item in the order.

Referring to FIG. 2, there is shown in detail a preferred dispenser unit for use in the merchandising system. The dispenser unit comprises a channel shaped track or chute 34 which is supported in an inclined position from a suitable framework (not shown) by a lower support bracket 36 and an upper support bracket 38. The brackets are arranged as shown to provide support from horizontal surfaces to maintain the track at an inclined angle of preferably 20°. This angle has been found sufficient to provide gravity feed of items stacked along the length of the track 34.

The lower bracket 36 is formed with a pair of integral side plates 40 which extend upwardly on either side of the track 34 and are positioned beyond the lower end of the track. Journaled in the vertical sideplates 40 is a shaft 42 to which are secured four identical paddle elements 44. The paddle elements each comprise a right angle member having one leg shorter than the other by an amount equal to the diameter of the shaft 42. The four paddle members are secured with the short legs of each angle spot-welded or otherwise secured to the outer end of the long leg of an adjacent paddle member, in the arrangement shown, thus forming a substantially square opening through which the shaft 42 extends. The paddle elements 44 extend along the shaft 42 substantially the full length between the sideplates 40. The shaft 42 is preferably welded to the assembled paddle elements 44.

The paddle elements are normally held against rotation by a sliding cam 46 formed with a stop 48 that engages one of the paddle elements 44 to prevent clockwise rotation of the shaft 42, as viewed in the drawing. The stop 44 and shaft 42 are so positioned that the particular paddle element 44 engaging the stop has its short leg parallel with the lower surface of the track 34 and with its long leg extending upwards at right angles thereto so as to form a stop against which the lowest item stored in the chute normally presses.

Cam 46 is slidably supported from the base bracket 36 by a slotted bracket 50 mounted adjacent one of the sideplates 40 by means of screws 52. The bracket 50 is provided with slots in the end portions thereof through which the sliding cam 46 passes. The upper end of the cam 46 is pivotably secured to the armature of a solenoid indicated generally at 54, the solenoid being mounted to the base bracket 36 by screws 56. A spring 58 secured at one end to the cam 46 and at the other end to the bracket 50 normally urges the cam 46 to the right as viewed in the figure, thereby maintaining the stop 48 in position to engage the paddle element 44.

When the solenoid 54 is energized, it moves the cam to the left against the action of the spring 58 so as to remove the stop 48 from engagement with the paddle element 44 and permit the paddle element and associated shaft 42 to rotate. Cam 46 is provided with a wedging surface 60 which engages one of the paddle elements at a point diametrically opposite from the stop 48. As the cam 46 moves to the left under the action of the solenoid 54, the wedging surface 60 engages one of the paddle elements 44, forcing it downwardly and imparting a clockwise rotation to the shaft 42 and associated paddle elements 44.

The resulting rotation lifts the lowermost item engaged with one of the paddle elements and at the same time urges it to the right with a sort of flipping action. This flipping action allows the item to fall beyond the lower end of the dispensing unit onto a conveyor belt positioned immediately below the dispensing unit. At the item drops onto the conveyor belt, it first engages a hinged plate 62 normally urged upward by a spring 64. A mercury switch 66 is mounted on the plate 62. The downward movement of the plate 62 by the weight of the item as it is dispensed onto the conveyor belt thereby actuates the mercury switch 66. The mercury switch 66 is connected in the control circuit, hereinafter to be described, in a manner to indicate that an item actually has been dispensed.

Power is applied to the solenoid 54 through a set of contacts controlled by a relay indicated generally at 68. The coil circuit of the relay 68 is connected in series with the normally closed switch 66 so that actuation of the switch 66 releases the relay 68 and breaks the current path to the solenoid 54. Control of the relay 68 will hereinafter be described in more detail.

The simplified dispensing system of FIG. 1 in which all items are dispensed onto a single conveyer belt does not take advantage of the inherent speed capabilities of the dispensing system. In order that a number of orders can be successively dispensed without interruption, a special transport system is provided by which the dispensed items can be selectively directed to one of a number of different receiving points.

Figure 3:
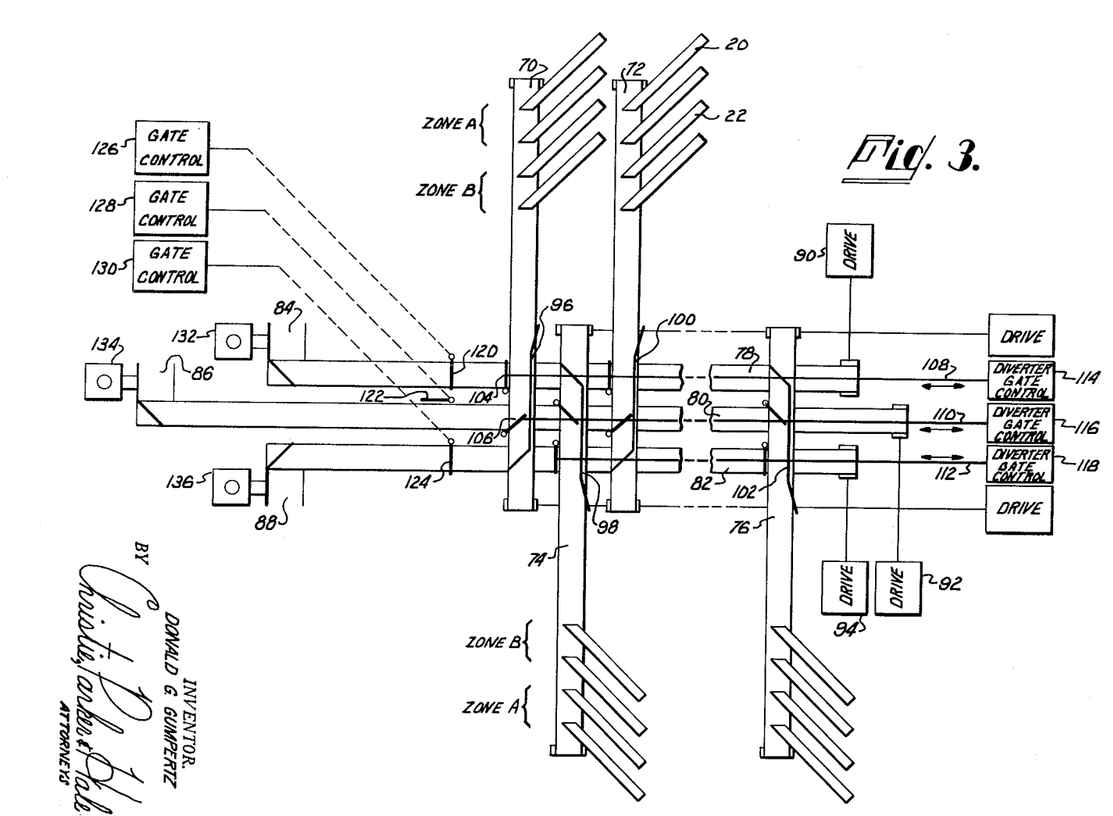
FIG. 3 is a plan view of the mechanical arrangement of the merchandising system.

The preferred transport arrangement is shown schematically in FIG. 13. The dispenser units as above described in connection with FIG. 2 are located in two groups of parallel bays. The dispensing units are arranged with their inclining tracks overlying each other with only sufficient space between to permit easy loading of the chutes. Each bay of dispensing units has associated therewith an underlying bay conveyor belt, several of which are indicated at 70 and 72 and at 74 and 76. While only two conveyer belts are shown for each of the two groups of bays, it will be understood that any number of bays can be provided in each group.

The conveyer belts of the two groups are interlaced in effect at the delivery ends remote from the dispensing units, the interlaced portions providing a common dispensing region which is underlaid by a plurality of collector conveyer belts, three of which are shown by way of example at 78, 80, and 82. Diverter means, to be hereinafter described in detail, is provided for directing the dispensed items from all the bay conveyers onto any selected one of the three collector conveyers. By rotating delivery between the three collector conveyers during successive orders, a considerably greater number of orders can be filled in a given time without danger of intermixing the dispensed items in successive orders.

The collector conveyers transport the items to respective ones of three order packing stations indicated at 84, 86, and 88 where the items are collected and packed into boxes for delivery to the customer. The respective collector conveyer belts are driven by suitable motor means, such as indicated respectively at 90, 92, and 94. The collector conveyer belts are referred to as #1, #2, and #3 collector channels respectively.

While the showing in FIG. 3 is schematic, it will be understood that the dispenser units in each bay, the bay conveyer belts, and the collector belts are all mounted on a suitable angle iron framework which supports the different members in the arrangement indicated.

Positioned above each bay conveyer belt at the inner delivery end thereof is a deflector board, such as indicated at 96, 98, 100, and 102. At the far end of the board remote from the dispenser units, each board angles around to direct the items carried by the associated bay conveyer belt onto an appropriate one of the collector belts.

Two movable diverter gates are associated with each bay conveyer belt, such as the gates indicated at 104 and 106 associated with the bay conveyer belt 70. These two gates are located above the associated bay conveyer belt in the region where the bay conveyer belt overlies the collector conveyer belts 78 and 80 respectively. The deflector gates are pivoted so that they can be moved from a position parallel with the edge of the bay conveyer belt to a position where they angle across a portion of the bay conveyer belt so as to deflect items moving along with the bay conveyer belt onto a selected one of the collector conveyer belts.

Each of the bay conveyer belts in the groups on either side of the collector conveyer belts are similarly provided with a pair of deflector gates. All the deflector gates associated with a given one of the collector conveyer belts are linked together by a common push rod, such as the rods indicated at 108, 110, and 112 respectively. Movement of these rods opens or closes all the associated deflector gates simultaneously. The rods are controlled by suitable motor drive means, such as indicated at 114, 116, and 118 respectively. In this manner, by selectively energizing one of the deflector gate drives, items delivered by all the bay conveyer belts can be deflected onto any selected one of the three collector conveyer belts.

Each collector conveyer belt is provided with a stop gate, such as indicated at 120, 122 and 124 respectively, each of the gates being selectively opened or closed by means of a suitable gate control mechanism as indicated at 126, 128, and 130. The purpose of the stop gates is to hold up orders while previous orders are being packed, thus preventing successive orders delivered by a given collector conveyer belt from becoming intermixed.

Each of the packer stations is provided with a pushbutton switch, as indicated at 132, 134, and 136 respectively, by means of which the associated stop gates can be opened to admit the next order to the packing station when the packer is ready.

Figure 4:
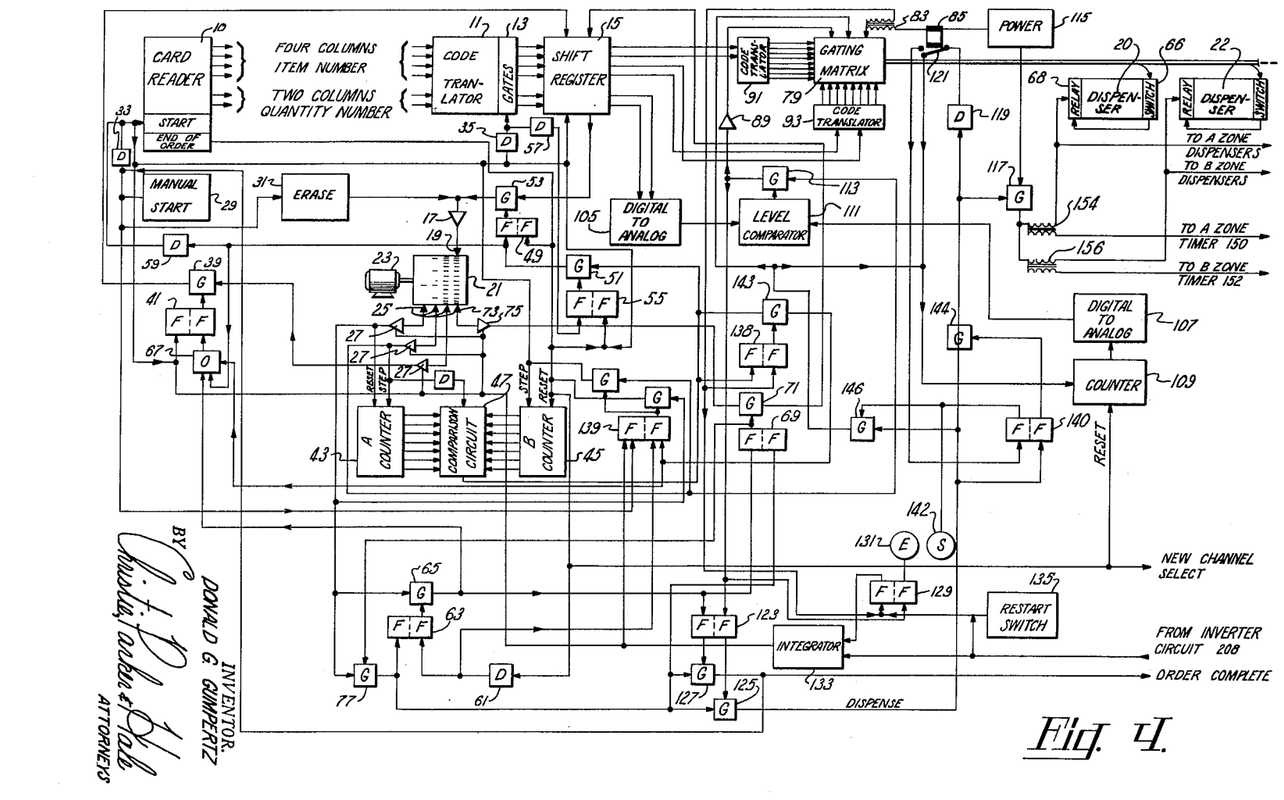
FIG. 4 is a logical block diagram of the central control circuit for actuating the dispensing operation.
Figure 5:
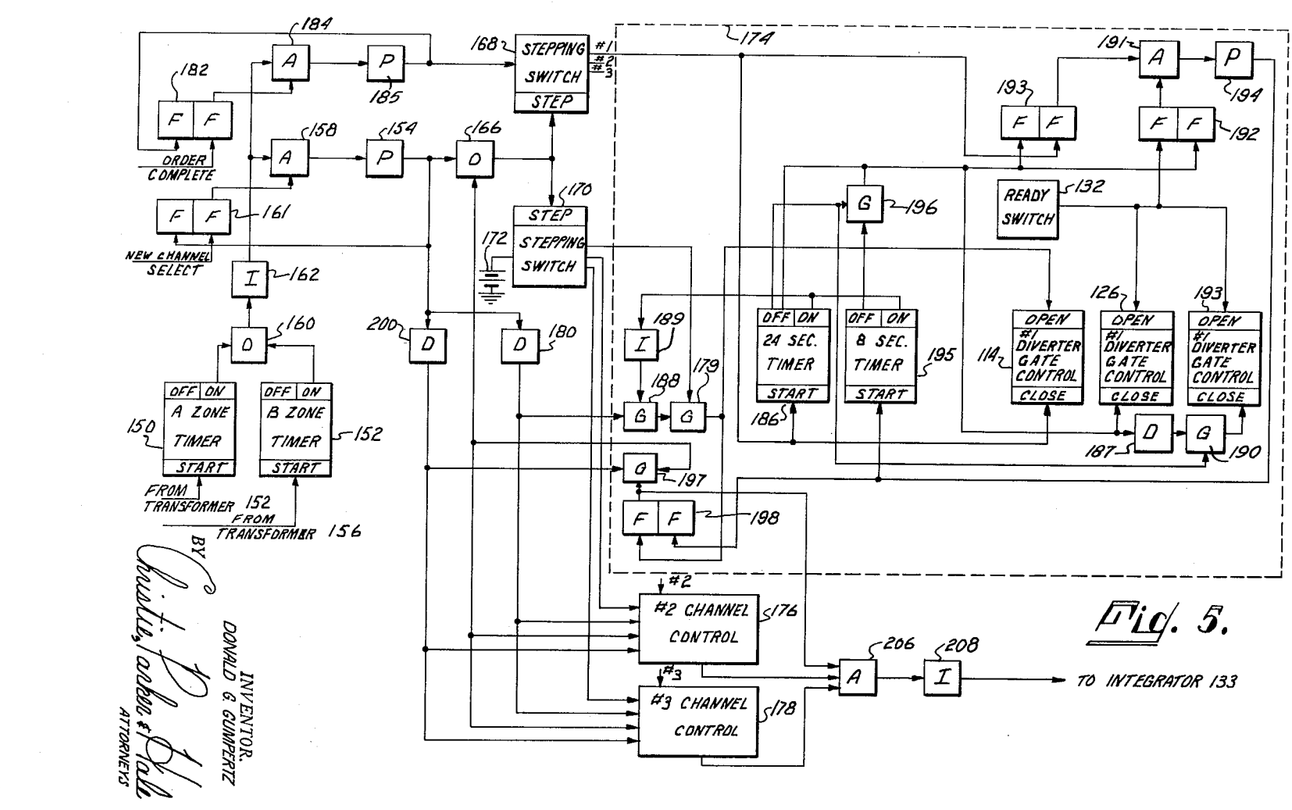
FIG. 5 is a logical block diagram of the transport programming circuit.

Dispensing control and transport programming of the system to select the desired types and quantities of items and transport them to the respective packing stations is provided by the circuits shown in block diagram form in FIGS. 4 and 5.

As indicated above, in the preferred form of the invention, each order is assembled in the form of a plurality of punched cards, each card having punched thereon information indicative of one item and the quantity of that item required. The item numbers may be as much as four digits in length, providing for ten thousand different items and using four columns of the punched card. The quantity number may be two digits for quantities up to a hundred and using two columns of the punched card. Obviously more columns may be used if required. Each punched card may have other information as well, particularly a number identifying the customer account. All the cards making up one order of course will have the same account number.

Once the order cards are assembled in a deck, they are placed in a punched card reader 10. This may be an IBM 416 numeric card reader, for example. The card reader is arranged to sense the punches in all the vertical columns of a punched card simultaneously as the card is fed through the machine. Stepping switches, one of which is associated with each card column reading brush, are stepped as successive rows of a card pass under the brushes. Each switch stops counting when a row is reached in which a punch is provided in the particular column. Thus after the card has been read, each of the stepping switches is set to energize one of ten lines corresponding to the ten rows on the punched card, according to which row in a given column has been previously punched. This is conventional punch card reading technique and is described in more detail in the prior art, such as Patent No. 2,718,356.

The output from the card reader 10 is coupled to a code translater circuit 11 which includes a separate section for each of the six groups of ten output lines from the card reader 10. Each section converts the one-of-ten decimal coded inputs from the card reader to a binary-coded decimal output. Any suitable binary code may be used, such as for example a 1–2–4–8 binary code or 2-out-of-5 code. Circuits for converting a 1-in-10 input to (for example) a 1–2–4–8 binary-coded decimal output are well known. Such circuits may use a diode matrix such as described in the book "Highspeed Computing Devices," by Engineering Research Associates, Inc., and published by McGraw-Hill Book Co., 1950, pages 40–43.

The six binary-coded decimal digits at the output of the code translater are transferred through output gates 13 in parallel to a shift register 15. The shift register 15 is of conventional type and includes four flip-flops for each of the six decimal digits stored, the flip-flops being set according to the parallel gated output from the code translater 11. Thus the shift register 15 stores one punch card of information at a time.

Information is shifted out serially from the shift register 15 through a write amplifier 17 to a recording head 19 associated with a revolving magnetic drum 21. The recording drum may be of conventional type having a magnetic surface and in which binary information is stored in the form of magnetic spots or cells on the surface of the magnetic drum as it is rotated continuously by a motor 23. The information is read out of the shift register 15 serially onto a single track on the surface of the magnetic drum 21.

The magnetic drum 21 includes three timing tracks in addition to the information track, the first timing track having a single bit for identifying the start of a complete revolution of the magnetic drum. The start bit is read out from the timing track by a readout head 25 and is coupled to a reading amplifier 27. The magnetic drum also includes a second timing track which divides the drum into word lengths. A word comprises the six digits normally identifying all the information on one punch card read into the drum. Thus the word timing track puts out a pulse at the end of each group of digits read into the shift register plus a delay interval required during the readout operation as hereinafter described. The third timing track on the drum generates clock or bit pulses corresponding to each bit storing cell in the information track. Both the word pulses and the bit pulses are also read out by suitable readout heads and reading amplifiers as indicated at 25 and 27.

In normal operation, all the cards identified with one order are placed in the card reader 10 and by proper timing control as hereinafter described are read in sequence onto the magnetic drum 21. The drum 21 at the end of the writing sequence therefore stores all the information required to dispense one complete order. The drum stores a limited number of words of course. If an order exceeds this number of items, the order may be divided up or additional information tracks may be used.

Transfer of information from the card reader 10 to the magnetic drum 21 is controlled in the following manner. A manual start button 29 is actuated by the machine operator after the group of cards associated with an order is placed in the card reader 10. This causes the information track on the drum to be erased by means of an erase circuit 31 which generates a bias voltage through the head 19 sufficient to saturate all the flux in one direction on the surface of the magnetic drum. At the same time, the card reader 10 is started to read out the first punched card, the start being controlled by the manual start button 29 through a delay circuit 33 which provides sufficient delay time to permit erasing of the magnetic drum. The start pulse is also fed to the shift register 15 for clearing the shift register to receive the first card of information.

The start-of-word pulse is also fed to the gates 13 at the output of the code translater 11 through a delay circuit 35. Thus after an interval of time sufficient for one card to be fed through the card reader as set by the delay circuit 35, the gates are triggered open by the delayed start-of-word pulse whereby one word is shifted in parallel to the shifting register 15.

To shift the information serially out of the shifting register 15 from the first punched card, bit pulses are applied to the shifting input of the register, the bit pulses being derived from the clock track of the magnetic drum through a gate 39 controlled by a flip-flop 41. The flip-flop 41 is controlled so as to open and close the gate 39 in a manner to synchronize the reading in of information onto the drum with the rotational position of the drum in order that the information of a given order stored on the drum is stored in proper relation with the start pulse and the word pulses. To this end an A counter 43 and a B counter 45 are provided which may, for example, be simple stepping switches, or for higher speed operation may be a conventional electronic counter, which can step up to the maximum number of word pulses generated in one revolution of the magnetic drum 21. The A counter 43 is stepped in response to word pulses derived from the word pulse track on the drum 21, the counter 43 being reset to zero by the start pulse so that the counter 43 is properly synchronized with the rotation of the magnetic drum 21. The B counter 45 is stepped by the start-of-word pulses applied to the card reader 10 and is reset to zero at the end of a complete order. An end-of-order pulse generated by the card reader 10 when the last card of an order is read out resets tht B counter 45. The end-of-order pulse may be generated, for example, by sensing the change in account number which occurs at the start of the next order, or may be sensed by a special punch on the last card of an order.

The A counter 43 and B counter 45 are coupled to a comparing circuit 47 which may consist of an "and" circuit associated with each output from the two counters. Thus each of the "and" circuits will be gated on when the A counter and B counter are in the same stepping condition. Word pulses derived from the magnetic drum 21 are fed through the "and" gate circuits of the compare circuit 47. Whenever the A counter and B counter are in the same count condition, one of the "and" gate circuits will be open, thus passing a word pulse to the flip-flop 41, the word pulse setting the flip-flop to its stable state in which it biases open the gate 39. The word stored in the shift register is then shifted out serially from the register 15 by the following bit pulses derived from the clock track on the magnetic drum 21 and passed by the gate 39. The flip-flop 41 is reset by the next start pulse applied to the card reader 10.

The output from the compare circuit 47 is applied to a second flip-flop 49 through a gate 51. If the gate 51 has been gated open, the compare pulse triggers the flip-flop 49 into its stable condition in which it biases open a gate 53 in series with the write amplifier 17 input, thus permitting the information shifted out of the register 15 to be written into the information track of the magnetic drum 21.

The end-of-order pulse resets the flip-flop 49 closing the gate 53. The gate 51 is controlled by a flip-flop 55 which in turn is controlled by the start-of-word pulse. The flip-flop 55 is biased by the start-of-word pulse to gate off the gate 51. However, after the word information has transferred to the shifting register, the same start-of-word pulse, delayed through the delay circuit 35 and an additional delay 57, triggers the flip-flop 55 to open the gate 51.

The compare pulse passed by the gate 51 opens the gate 39 to pass shifting pulses to the register 15, causing the register to shift information to the drum 21. The compare pulse is also delayed by a delay circuit 59 a sufficient time to clear the shift register and then is passed to the card reader 10 to serve as the next start-of-word pulse. It will be noted that the start-of-word pulse resets the flip-flop 41 to turn off the gate 39.

From the description thus far it will be seen that each punch card is translated into a binary code and transferred to the magnetic drum in sequence. By virtue of the A counter and B counter comparison, transfer from the shift register to the drum is such that successive card information is read into successive word positions in the information track. Thus after all the cards are read into the magnetic drum, six binary-coded decimal digits are stored on the drum between each pair of successive word pulse positions. Once all the information relating to one order is read into the magnetic drum, the end-of-order pulse derived from the card reader 10 initiates the dispensing cycle in which the information on the drum is used to control the various dispensing units to dispense the required quantity of all the items in the order.

To this end-of-order pulse produced after all the cards in one order have been readout of the card reader 10 is coupled through a delay circuit 61, the function of which will hereinafter be described, to a flip-flop 63 which controls a gate 65. When the flip-flop 63 is triggered by the delayed end-of-order pulse, it opens the gate 65 to which is applied the output from the start pulse track of the magnetic drum 21. This provides a start-of-readout pulse which is applied to the flip-flop 41 through the "or" circuit 67 to bias open the gate 39, permitting clock pulses to be fed to the shift register 15.

At the same time the start-of-readout pulse from the gate 65 is applied to a flip-flop 69 which controls a gate 71, the start-of-readout pulse triggering the flip-flop 69 to bias open the gate 71. The gate 71 passes information from a readout head 73 on the magnetic drum from which the information bit pulses are derived from the information track and amplified by an amplifier 75. The information readout is transferred through the now open gate 71 to a serial input of the shift register 15. The information is read out through one complete revolution of the magnetic drum through the shift register 15, and at the end of one complete revolution, a second start bit is generated by the magnetic drum 21. The start bit passes through a now open gate 77 controlled by the flip-flop 69, the output pulse from the gate 77 triggering the flip-flop 63 to close the gate 65, and at the same time triggering the flip-flop 69 to close the gate 71 and the gate 77.

As each word is shifted into the register 15, it controls the priming of an appropriate one of the dispensing units, such as the units 20 and 22 described above. This is accomplished in the following manner. The four binary-coded digits in each word as stored in the shift register 15, corresponding to the four digits identifying by number the item to be dispensed, control a gating matrix circuit 79. The gating matrix is shown in more detail in FIG. 6. The gating matrix circuit 79 comprises a plurality of thyratron tubes 81 arranged in a matrix configuration, the plate of each thyratron being connected to a different one of the dispensing units of the type described above in connection with FIG. 2. The plate of each thyratron is connected to the plus side of a power supply through the relay coil of the relay 68 associated with one of the dispensing units, such as the unit 20 and through the mercury switch 66 associated with the dispensing unit. Thus when a given one of the thyratrons 81 in the matrix is fired, it energizes the relay 68 of the associated dispensing unit so that current can be applied to the solenoid to actuate that particular dispensing unit at the appropriate time. Once an item is dispensed by the associated dispensing unit, the switch 66 is momentarily opened, thereby extinguishing the thyratron tube.

Figure 6:
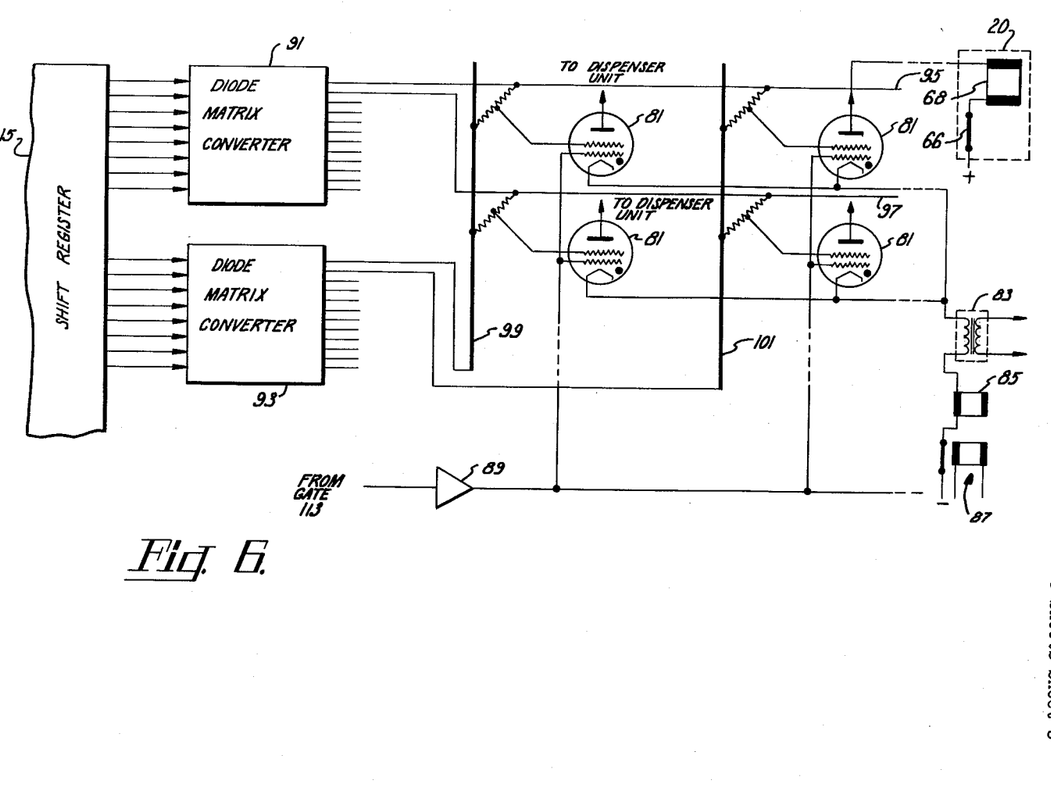
FIG. 6 is a schematic diagram of a suitable gating matrix for the dispensing unit control circuit.

The cathodes of all the thyratron tubes 81 in the matrix are connected together to the negative side of the power source through a pulse generating transformer 83, the coil of a current sensitive relay 85 and a normally closed switch operated by relay 87. Whenever a thyratron tube 81 in the matrix is fired, in a manner to be hereinafter described, the transformer 83 puts out a pulse and the relay 85 is energized. The relay 85 remains energized as long as at least one of the thyratrons is conducting current.

All of the control grids of the thyratrons 81 are connected together to the output of a single pulse amplifier 89 from which a tube firing pulse is derived in a manner hereinafter set forth.

To control the firing of an appropriate one of the thyratrons in the matrix in response to item information stored in the shifting register 15, the eight flip-flops in the register which store two of the binary-coded digits comprising the item number are each connected to a diode matrix converter circuit 91. The diode matrix converter circuit is arranged to sense the stable condition of the eight flip-flops and energize to a high potential level one of a hundred different output lines according to the two binary-coded decimal digits stored in the shift register. A diode matrix converter circuit 93 similarly senses the eight flip-flops in the shift register storing the other two decimal digits of the four digit item number, energizing one of a hundred output lines to a high potential level according to the condition of the respective flip-flops in the shift register. The diode matrix converter circuits 91 and 93 utilize well known techniques and need not be described in detail. For further information on matrix converter circuits, see the article "Digital Automation," by M. Cline, F. Williams, and H. Morgan in the magazine Instruments and Automation, December 1955, page 2109.

The output from the converter 91 is arranged as one hundred horizontal buses, two of which are indicated at 95 and 97, while the output from the converter 93 is arranged as one hundred vertical buses in the matrix, two of which are indicated at 99 and 101.

A resistor is connected between each vertical bus and each horizontal bus, such as the resistor 103 connected between the horizontal bus 95 and the vertical bus 101. The midpoint of these resistors may be connected to the screen grids of the associated thyratrons in the matrix. Only if both buses associated with a given resistor in the matrix are raised to a high level by the item number stored in the shift register as sensed by the converters 91 and 93 is the screen grid biased to a level at which the associated thyratron can be fired by the pulse applied to the control grid from the amplifier 89.

Thus it will be apparent that each word shifted out of the drum memory 21 into the shift register 15 permits one of the thyratrons in the gating matrix to be fired, namely, the thyratron which primes the appropriate dispensing unit for dispensing the required item. Whether or not a thyratron is actually fired depends upon whether or not any more of that particular item is required to be dispensed to fill the requirements of the order. This is determined by making a comparison of the quantity of each item required with the number of items previously dispensed. The quantity comparison may be made in the following manner.

The two binary-coded decimal digits indicating the quantity of each item and associated with each word read into the shift register 15 from the drum memory are sensed by a digital-to-analog converter 105 which converts the digital number to a voltage level at the output. Such digital-to-analog converters are well known, one suitable type being described in Patent No. 2,736,889. The voltage level at the output of the digital-to-analog converter 105 is compared with the voltage level at the output of a similar digital-to-analog converter 107 controlled by a two digit binary-coded decimal counter 109. The counter 109 is reset to zero by the end-of-order pulse from the card reader 10 so that it initially has a count of zero stored in it.

During the first readout from the magnetic drum 21, the quantity number for each item in the order is necessarily greater than zero, which means the level from the converter 105 is higher than the level from the converter 107 for every item. These two levels are applied to a voltage level comparator circuit 111. The comparator circuit 111 may be of any suitable type for making amplitude comparisons. See for example the amplitude comparison circuits described in the book "Waveforms," vol. 19 of the Radiation Laboratories series, McGraw-Hill Book Co., 1949, Chap. 9. Whenever the level of the converter 105 extends the level of the converter 107, the comparator circuit 111 biases open a gate 113, passing word pulses from the word pulse track on the magnetic drum 21 to the input of the pulse amplifier 89. As a result, the item identified by each word as it appears in the shift registed 15 results in the firing of an appropriate one of the thyratron tubes in the matrix 79 only if the quantity associated with the item in each word stored in the shift register exceeds the number of that item already dispensed, as determined by the counter 109. The counter 109 is set in a manner hereinafter to be described every time any one of the dispensing units is caused to dispense an item.

At the end of the first complete revolution of the magnetic drum 21 following the start of readout, every thyratron in the grating matrix 79 which corresponds to an item called for in the order read out from the magnetic storage drum has been fired. The dispensing units associated with the fired thyratrons have their control relays 68 closed. Power is simultaneously applied to the solenoids of each of the selected dispensing units through the closed relays 68. To this end, power from a source 115 is applied through a relay gate 117 to the closed relays of the selected dispensing units for energizing the appropriate solenoids and simultaneously dispensing items from each of the selected dispensing units. The relay gate 117 is actuated in response to a dispense pulse derived from the output of the gate 77 through a gate 125. As mentioned above, this pulse occurs in response to a start pulse derived from the magnetic drum 21 at the completion of the first full revolution or readout.

This dispense pulse is used to step the counter 109, the dispense pulse being delayed by a delay circuit 119 and coupled to the stepping input of the counter 109 through a normally closed switch 121 controlled by the relay 85 in series with the power supply for the thyratrons of the gating matrix 79. The function of the relay 85 and associated switch 121 is to prevent counting of the counter 109 if all of the thyratrons have not been extinguished following the pulsing of the dispensing units. It will be seen that if any of the dispensing units is empty, the associated mercury switch 66 will not be actuated and so the associated thyratron in the gating matrix 79 will not be extinguished. In this case, it is desired that the counter not be advanced.

Assuming for the moment that all the items have been dispensed, the delayed dispense pulse starts another readout cycle from the drum memory by actuating the flip-flop 63 to open the gate 65. Again all the words are shifted through the shift register 15 and the new quantity comparison is made with the counter 109 now counted to the digit 1 condition, indicating that one of all items have already been dispensed. Only those items which require two or more will result in an output from the comparator 111 to open the gate 113. At the end of the second comparison, a dispense pulse is again applied to the relay gate 117 and appropriate ones of the dispense units are activated and the counter 109 again stepped up.

To determine when all the required items in a given order have been dispensed, a flip-flop 123 is provided which controls a gate 125 by which the dispense pulse is gated to the relay gate 117. Normally whenever a word pulse is passed by the gate 113 for firing a thyratron in the gating matrix 79, the flip-flop 123 is at the same time triggered to open the gate 125. If all the required units have been previously dispensed, at no time during the last complete readout does the comparator 111 open the gate 113.. Therefore the gate 125 remains closed and no dispense pulse is applied to the relay gate 117.

However, the flip-flop 123 may be arranged to control a second gate 127 also connected to the output of the gate 77. With the gate 125 closed, the gate 127 is open, thereby diverting what would otherwise be the dispense pulse to a separate output, providing a pulse which indicates that the order is complete.

This order-complete pulse is used to control the programming circuit associated with the conveyor transport system of the machine as described hereinafter in connection with FIG. 5. The order-complete pulse may also be used if desired to restart the card reader 10 and initiate read in of the next order to the drum 21.

Before describing the operation of the programmer for the transport system, it is well to first consider several of the self-checking features incorporated in the control circuit of FIG. 4 whereby failure of the machine to dispense the given item is indicated. The first check is to determine whether a thyratron has fired as required in response to a word pulse passed by the gate 113. To this end the pulse transformer 83 is provided which senses the change in current level from the power source 115 whenever an additional thyratron is rendered conductive. The pulse transformer 83 provides what may be termed an echo pulse that is returned to indicate that a thyratron has fired in response to a firing pulse. A flip-flop 129 is controlled by the firing pulse from the output of the gate 113 and also by the echo pulse generated by the pulse transformer 83 from the firing of any thyratron in the matrix 79. The firing pulse from the gate 113 sets the flip-flop 129 to one stable condition in which it causes an error-indicating light 131 to light up on the operator's control panel.

If the firing pulse results in proper firing of a thyratron tube in the matrix 79, an echo pulse is generated by the transformer 83 which immediately returns the flip-flop to its initial stable condition, turning off the indicator light 131. The echo pulse occurs in such a brief instant following the firing pulse that the indicator light 131 does not produce a visual indication with normal operation. However, in the absence of an echo pulse, the error-indicator light remains on indefinitely, providing an error indication to the operator of the machine.

The flip-flop 129 also controls the bias on the readout amplifier associated with the timing tracks and information track of the magnetic drum 21. When the flip-flop 129 is not returned to its initial condition immediately by the echo pulse from the pulse transformer 83, an integrator circuit 133, after a delayed interval, permits the bias level to drop on the several readout amplifiers below cut-off for the associated stages of the amplifiers. This blocks reading out further pulses from the magnetic drum 21. At the same time the change in level at the output of the integrator 133 causes the flip-flop 41 to be set so as to bias off the gate 39.

Biasing off of the readout amplifiers prevents further operation of the control circuit until a restart button 135 is actuated by the operator. The restart button 135 resets the flip-flop 129 so as to again bias on the readout amplifiers associated with the drum 21. However, this does not reset the flip-flop 41 and the gate circuit 39 remains off. As a result the restart button 129 does not immediately start shifting of information into the shift register. It is desirable that shifting and further operation of the readout circuitry be delayed until the next word in sequence following the word which initiated the error comes under the readout heads of the magnetic drum 22.

For this purpose the B counter 45 is normally caused to slave to the A counter 43 during readout from the drum 21 by connecting the step and reset pulses applied to the A counter 43 simultaneously to the B counter 45. The step and reset pulses are applied to the B counter 45 through gates 137 and 141 which are controlled by a flip-flop 139. The start-readout pulse from the delay circuit 61 sets the flip-flop 139 at the start of the readout operation to open the gates 137 and 141 so that during readout the B counter 45 normally is slaved to the A counter 43. The flip-flop 139 is reset at the same time that the readout amplifiers are biased off by the action of the error flip-flop 129 following a failure of echo pulse. Actuating the restart button 135 does not restart the B counter, so that the B counter provides a storage means for indicating at what point readout had been stopped.

When the A counter 43 is again advanced to the same count as was left on the B counter 45, a comparison pulse is generated by the comparison circuit 47. This again sets the flip-flop 139 to open the gates 137 and 141, the comparison pulse being passed by a gate 143 controlled by a flip-flop 138. The gate 143 is opened by the flip-flop 138 in response to the restart button 135. At the same time, the comparison pulse passed by the gate 143 is used to actuate the flip-flop 41, thereby opening the gate 39 and resuming shifting operation of the register 15 to shift in the next word read out from the drum memory 21. The comparison pulse passed by the gate 143 also is used to reset the flip-flop 138 and close the gate 143. Thus the restart button 135 restores the circuit to normal readout operation, starting with the next word in memory following the word in which an error caused interruption of operation.

The second error which is detected is a shortage of items in the dispensing unit. As mentioned above, if no unit is dispensed, the switch 66 associated with the dispensing unit is not tripped and as a result the associated thyratron tube remains conductive. If any of the thyratrons remain conductive after the dispense operation, the dispense pulse passed by the delay circuit 119 can not be directed to the counter 109 as previously, because the relay 85 remains energized. With the relay 85 still energized, the switch 121 directs the delayed dispense pulse to set a flip-flop 140 to turn on a shortage indicator 142. The flip-flop 140, at the time it turns on the indicator 142, turns off a gate 144 preventing the next dispense pulse from being passed through the relay gate 117. At the same time, the flip-flop 140 turns on a gate 146 permitting the next dispense pulse to be passed to the coil of the relay 87 (see FIG. 6). By energizing the relay 87, all the thyratrons in the gating matrix are extinguished. The dispense pulse also rests the flip-flop 140 back to its initial condition, again opening the gate 144.

In operation, if a thyratron is left on following the dispense cycle, the flip-flop 140 is set, opening the gate 146 and closing the gate 144. The dispense cycle starts over as before except the counter 109 remains in its same count condition. When an item is reached which was not dispensed as required during the previous cycle, because the thyratron associated with that dispense unit has remained conductive, no echo pulse can now be generated. As a result the flip-flop 129 does not reset, giving rise to the same result as above-described where a thyratron fails to fire.

Once the reset button 135 is actuated, however, which the operator would do after noting the item which is short, the dispense control circuit continues. If only the one unit was short it will reach the end of the cycle in which the dispense pulse is produced at the output of the gate 125. This is blocked by the now closed gate 144 but resets the flip-flop 140 and at the same time extinguishes all the thyratron gating tubes in the matrix 79.

The dispense pulse which is now passed through the open gate 146, is directed to the counter 109 to advance the counter one count. From this point on the operation continues in normal fashion. It should be noted that a suitable indicator may be provided in connection with the shift register to indicate the item count in the register at all times. Thus at any time an error occurs stopping further shifting of the register 15, this indicator will provide an indication of which item has not been dispensed.

Once the items are dispensed they are transported by the bay conveyor belts to one of the collector conveyor belts. Thus at the end of the dispensing of an order and at the start of the readout of the next order, the bay conveyor belts and the particular collector conveyor belt may not be cleared. For this reason further dispensing onto the bay conveyor belts is delayed until they are cleared of items from a previous order, and, because the collector conveyor belts are longer and slower operating, a different collector conveyor belt is selected for each order before it is dispensed. FIG. 5 shows the programming circuit for controlling the transport of successive orders by different collector belts.

Assume that one order has just been dispensed by the control circuit of FIG. 4 so that dispensed items may be in transit on the bay conveyers and the collector conveyer. The start of the next order produces an end-of-order pulse from the card reader 10. This end-of-order pulse, which occurs after the information is transferred from the card reader to the magnetic drum and before the magnetic drum starts the readout dispensing cycle, goes to the programmer circuit of FIG. 5 as a Select New Channel pulse for selecting a new collector channel. This pulse is used to actuate one of the three diverter gate controls 114, 116, and 118 for opening one set of diverter gates associated with one of the collector channels.

Before opening a new set of diverter gates, the programmer circuit must first check to see that all items from a previous order have left the bay conveyor belts. This is done by a group of zone timer circuits such as an A zone timer circuit 150 and a B zone timer circuit 152. As mentioned previously, the dispensing units associated with each bay may be divided up into two or more zones, two zones being designated as zone A and zone B. Timers are associated with each zone and are actuated only if items were dispensed in the corresponding zone. For example, if zone A is the outermost zone, the greatest length of time will be required for items to be transported from zone A to the collector belt. Therefore the zone A time would provide the greatest time delay. The B zone timer then provides a shorter delay time. The purpose of dividing the bay conveyers into zones is to shorten the overall time of operation so that in the event no items are dispensed from zone A, a shorter time delay can be provided before a new channel is selected. In order to increase the likelihood that no items will be dispensed from channel A at the termination of one order, the items which are generally dispensed in the lowest quantities are located in the dispensing units of zone A.

Referring back to FIG. 5, zone A timer 150 is triggered whenever zone A dispensing units are actuated. The pulse for setting the zone A timer is derived from a pulse transformer 154. See FIG. 4. The pulse transformer generates an output pulse in response to the energizing of the zone A dispensing units from the power source 115 through the relay gate 110. Similarly the zone B timer 152 is set by a pulse generated from a pulse transformer 156. The pulse transformer 156 is pulsed with the energizing of any of the zone B dispensing units by the power source 115 through the relay gate 117. When either of the zone timers 150 and 152 are triggered on, indicating units that have been dispensed from either the A zone or the B zone of the dispensing units, they provide a high level output, which levels are applied through an "or" circuit 160 and an inverter circuit 162 to the "and" circuit 158. Only when both the A zone timer and the B zone timer have returned to their initial off position is a high level applied to the "and" circuit 158. Since the A zone timer provides a longer time unit corresponding to the time required from the items dispensed in the A zone to be cleared from the bay conveyer belt, it will control the opening of the gate 158 if items are dispensed from both the A zone and the B zone dispensing units. Otherwise the B zone timer will control the "and" circuit 158.

The new channel select pulse is applied to a flip-flop 161 which provides a high level at the input of the "and" circuit 158. If neither zone timer has been actuated, the "and" circuit 158 provides a high level at the output thereof. The change to a high level is converted to a pulse by a pulse circuit 159, such as a differentiating and clipping circuit, and applied through an "or" circuit 166 to the stepping input of a pair of stepping switches 168 and 170 respectively. Stepping switch 170 connects a high potential level from a source 172 to one of three output leads for each of the three channels. For simplicity, only one of the channel control circuits is shown in detail, namely, the control circuit associated with the #1 collector channel, indicated generally at 174. The other channel control circuits are indicated at 176 and 178. The #1 channel lead from the switch 170 biases open a gate 179, when the switch 171 is stepped to the #1 channel position.

If either of the A zone timer or the B zone timer indicates that dispensed units have not cleared the bay conveyer at the time a new channel select pulse is received, the "and" circuit 158 is biased off, delaying the time at which the stepping switch 170 is actuated. A delay circuit 180 is provided for delaying the new channel select pulses as applied to the gate 179 a sufficient time to permit the stepping switch 170 to step to the #1 channel position from the previous #3 channel position.

The new channel select pulse as passed by the gate 179 actuates the #1 diverter gate control circuit 114 to open the diverter gates associated with the #1 collector channel. All subsequent items dispensed during a particular order are therefore diverted onto the #1 collector channel conveyer belt. Dispensed items in a given order are carried by the collector conveyer belt to the point where they engage the associated stop gate 120 controlled by the #1 stop gate control circuit 126. Dispensed items are retained by the stop gate until the operator at the packing station pushes the associated "ready" switch 132 which actuates the stop gate control 126 to open the stop gate.

After the last item of a given order has been dispensed, an order complete pulse is derived from the output of the gate 120 as described above in connection with FIG. 4. This pulse actuates a flip-flop 182, producing a high voltage level which is applied to an "and" circuit 184. The "and" circuit 184 is controlled by the A zone timer 150 and B zone timer 152 in the same manner as the "and" circuit 158 described above. Once the items have cleared the bay conveyer belts and flip-flop 182 has been set by the order complete pulse, the "and" circuit 184 produces a high level output. The change to a high level produces a pulse by means of a pulse circuit 185, which may be a conventional differentiating and clipping circuit.

This pulse is distributed by the stepping switch 168 to one of the three outputs, the two stepping switches 168 and 170 normally being arranged to couple outputs to the same one of the channel control circuits. Thus the stepping switch 168 under the present example passes the pulse to the #1 channel control circuit 174, and in particular to the diverter gate control circuit 114 at the termination of the order and after the bay conveyer belts have had time to clear. At the same time this pulse closes the diverter gate it starts a 24-second timer switch, the 24 seconds corresponding to a typical maximum time for the conveyer belt to transport all the items of the order past the associated stop gate following the time of the order complete pulse. While the timer 186 is turned on, it closes a gate circuit 188 through an inverter 189. The gate 188 is in series with the source of new channel select pulses fed to the gate 179. This prevents the #1 diverter gate from being opened again before a previous order has cleared the stop gates associated with the #1 collector channel.

If the "ready" switch 132 is closed before a channel is selected by the stepping switches, the stop gate 120 is immediately opened to receive the next order as it is dispensed. If the ready switch 132 has not been actuated, the stop gate remains closed, of course, and the items pile up behind the stop gate. To prevent the belt from rubbing the items held by the stop gate for long periods of time, at the termination of the order when the diverter gate control 114 is actuated to close the #1 channel diverter gates in response to an order complete pulse, the belt is stopped. This is done by means of a gate 190. The timer 186 is turned on for 24 seconds. When the timer 186 again turns off it opens the gate 190 and at the same time generates a pulse which is delayed by a delay circuit 187 and passed by the now open gate 190 to the #1 channel collector belt drive indicated at 90, to stop the belt. The belt drive is started again when the ready switch 132 is again actuated. The timer 186 at the end of the 24-second period also actuates the #1 stop gate control to close the stop gate if it has been opened.

At the same time that the ready switch 132 opens the stop gate and starts the belt drive, it applies a high level to one input of an "and" circuit 191 by means of a flip-flop 192. A high level is also applied to the "and" circuit 191 by flip-flop 193 when set by the order complete pulse passed by the stepping switch 168. Therefore when the order is complete and the ready switch 132 is pressed, the "and" circuit 191 puts out a high level which is converted to a pulse by a pulse circuit 194. The flip-flops are reset with the closing of the #1 channel diverter gates. The pulse from the pulse circuit 194 turns on an 8-second timer 195. The 8-second interval is to allow sufficient time for the items in one order stacked up against the stop gate to pass under the now open stop gate to the packer's station. At the end of the 8 seconds, the timer generates a pulse which actuates the stop gate control 126 to close the associated stop gate in the #1 collector channel. However, the pulse generated by the turning off of the timer 195 must pass through a gate 196 controlled by the timer 186 so that the output of the timer 195 is passed to the stop gate control 126 if the timer 186 is off.

In order that the #1 channel will not again be selected until the previous order has moved past the stop gate to the packer station, the stepping switch 170 may be caused to step twice in response to a new channel select pulse, so as to pass over the particular channel that is not clear. This is accomplished by means of a gate 197 controlled by a flip-flop 198. The flip-flop 198 is set by the output from the gate 179. Whenever a new channel select pulse is passed by the gate 179 it sets the flip-flop 198 to open the gate 197. The gate 197 remains open until the flip-flop 198 is reset by the pulse from the pulse circuit 194. If a new channel select pulse should actuate the stepping switch 170 to open the gate 179 before the ready switch 132 has been actuated and the #1 diverter gates closed, the gate 197 passes a pulse that makes the stepping switch step a second time so as to immediately close the gate 179 before the output pulse from the delay circuit 180 is passed to the diverter gate control 114. The pulse passed by the gate 197 for effecting the second stepping of the switch 170 is accomplished by passing the channel select pulse through a delay circuit 200 to the gate 197 and back through the "or" circuit 166 to the stepping input of the switch 170. The delay 200 is just sufficient to permit the stepping switch to complete one step, so that the pulse passed by the gate 197 steps it a second time. It is sufficiently shorter than the time delay 180, so that the stepping switch will be stepped twice, again closing the gate 179 before the output of the delay 180 can be passed by the gate 179.

Additional collector control circuits as indicated at 176 and 178 are provided for controlling each of the channel diverter gates and channel stop gates associated with each of the different collector belts, and are identical to the circuit 174 as described above.

In the event that orders have piled up behind the stop gates in all the channels, it is desirable to stop the dispensing control circuit. This may be accomplished by sensing if the gate 197 of all the collector circuits is open. To this end the output of the flip-flop 198 in each of the collector control circuits 174, 176 and 178 is applied to an "and" circuit 206. The "and" circuit 206 provides a high level output if none of the flip-flops 198 associated with the respective collector control circuits have been reset by the "ready" switches 132. This high level may be inverted by an inverter 208 and applied to the input of the integrator 133 of FIG. 4, thereby interrupting operation of the readout portion of the dispensing circuit until one of the collector channels is cleared. At this time the resulting rise in level at the output of the inverter 208 may be differentiated to derive a pulse for restarting the readout portion of the dispensing control circuit in the same manner as the readout switch 135 described above.

It will be understood that the above description is given by way of example only and that many changes can be made as apparent to one skilled in the art without departing from the scope of the invention. Relays and relay switching techniques may be used throughout rather than electronic gates and flip-flops as described, since the speed of operation of the control circuit may be relatively slow. The number of dispensing zones as well as the number of collector channels may be modified according to circumstances.

From the above description it will be recognized that a machine for effecting automatic dispensing of large numbers of different items is provided. By using a temporary storage for each order, parallel dispensing, i.e., dispensing one of every item in an order simultaneously, is possible, greatly decreasing the time required to dispense a large number of different items. Failure to dispense and shortages of items are immediately indicated, preventing incorrect order filling. Greatly improved speed of operation, flexibility, and reliability are apparent.

What is claimed is:

1. A dispensing apparatus comprising a plurality of electrically energized dispensing units, each unit dispensing a single item when energized, and a control circuit for controlling the dispensing units including an information source for storing and reading out electrically coded information as to the required items and associated quantity of each item to be dispensed, temporary memory means connected to the source for storing coded information for a group of coded items and associated quantities from the information source, means for reading out serially coded information for each item and the associated quantity from the memory means, gating means associated with each dispenser unit, means for opening each of the gating means in response to an associated coded item as it is read out of memory, a counter circuit, means for comparing the coded quantity as it is read out of the memory means with the coded number stored in the counter circuit, said comparing means generating an output pulse when the coded quantity is greater than the number stored in the counter circuit said output pulse being applied to the gating means, whereby the pulse is passed by the gating means previously gated open by the associated coded item as read out of memory, the pulse being passed to the dispensing unit coupled to the open one of the gating means for activating the dispensing unit, and means for advancing the counter circuit one count following readout of one complete group of items from the memory means.

2. A dispensing apparatus comprising a plurality of electrically energized dispensing units and a control circuit for controlling the dispensing units including an information source for storing and reading out electrically coded information as to the required items and associated quantity of each item to be dispensed, temporary information storage means connected to the source for storing a group of coded items and associated quantities from the information source, means for reading out each coded item and the associated coded quantity from the storage means, gating means associated with each dispenser unit, means for opening each of the gating means in response to an associated coded item as it is read out of the storage means, a counter circuit, means for comparing the coded quantity as it is read out of the storage means with the coded number stored in the counter circuit, said comparing means generating an output pulse when the coded quantity is greater than the number stored in the counter circuit, said output pulse being applied to the gating means whereby the pulse is passed by the gating means previously gated open by the associated coded item as read out of the storage means, the pulse being passed to the dispensing unit coupled to the open one of the gating means for activating the dispensing unit, and means for advancing the counter circuit one count following each readout of one complete group of items from the storage means.

3. Dispensing apparatus comprising means for storing in electrically coded form a group of pairs of numbers, the numbers in each pair being indicative of an item and quantity respectively to be dispensed means for repeatedly reading out the numbers stored in said storing means, a plurality of electrically operated item dispensing units, a counter for storing an electrically coded number, means for advancing the counter following each complete readout of all the numbers from the storing means, means for comparing each quantity number with the number stored in the counter, means responsive to the comparing means for generating a signal when the counter number is less than the compared quantity number, a gating circuit controlled by the item numbers for gating signals from the comparing means to selected ones of the dispensing units according to the values of the item numbers, and means associated with each dispensing unit for activating said unit in response to the signal from the comparing means gated to said unit by the gating circuit.

4. Apparatus comprising means for storing in electrically coded form information indicative of the item types and quantity of each type required to be dispensed, a plurality of dispensing means for selectively dispensing a plurality of different items, each dispensing means when activated and primed dispensing one item when triggered, means for cyclically reading out information from the storing means, means responsive to the storing means for selectively priming particular ones of the dispensing means during each cycle of readout according to the stored item type information, means for counting the number of readout cycles, means responsive to the counting means and the storing means for activating during each readout cycle all the primed dispensing means in which the associated stored quantity exceeds the number of previous readout cycles, and means for triggering each of the dispensing means that have been activated and primed at the completion of each cycle of readout from the storing means, whereby the plurality of dispensing means dispense one of each of the selected items following a given readout cycle as determined by the items whose quantity has not been filled during previous readout cycles.

5. Apparatus for dispensing groups of difference items of varying quantities, comprising means for storing in electrically coded form the required item information and quantities of each in a given group, a plurality of electrically operated item dispensers, means for cyclically reading out the electrically coded item and quantity information from the storing means, means for counting each complete readout cycle, means for completing selection circuits to predetermined ones of the dispensing means in response to the item information read out of said storing means during each complete readout cycle, means for comparing the quantity information of each item read out of the storing means during a readout cycle with the number of previous readout cycles as stored in the counting means, and means responsive to said comparison means for energizing said completed selection circuits for each item in which the quantity is greater than the number of previous readout cycles for activating the dispensing means associated with the completed selection circuits.

6. Dispensing apparatus comprising a plurality of electrically operated item dispensing units, a thyratron driving circuit for driving the dispensing units, there being one thyratron for each dispensing unit, a normally closed switch associated with each dispensing unit, means for momentarily opening the switch in response to an item as it drops out of the dispensing unit, the switch being connected in series with the thyratron and associated dispensing unit, whereby actual dispensing of an item breaks the thyratron circuit permitting the thyratron to be extinguished, means for selectively firing the thyratrons according to which items are to be dispensed, means for sensing which thyratrons fail to be extinguished, means responsive to said sensing means for reactivating said selective firing means, and means for sensing when a selected thyratron fails to change its conductive state in response to the reactivating means, said last-named sensing means producing an error indication whenever a thyratron fails to change its conductive state.

7. Dispensing apparatus comprising a plurality of electrically operated dispensing units, memory means for storing item and quantity information relating to one complete order in electrically coded form, a switching matrix including a plurality of thyratron driving tubes, each thyratron tube driving one dispensing unit, means for periodically reading out the order information from the memory means, translating means for priming selected ones of the thyratrons in response to the electrically coded item information read out from the memory means by said readout means, a counter, means for advancing the counter one count with the completion of each periodic readout from the memory means, means for comparing the count condition of the counter with quantity information for each item read out of the memory means, means for applying a pulse to all the thyratrons whenever the comparing means indicates the count condition of the counter has not exceeded a predetermined numerical relationship to the quantity information for each item as read out of the memory means, the pulse firing any thyratron that has been primed, means responsive to the firing of any of the thyratrons for generating an echo pulse, and error indicating means primed by each firing pulse and reset by each echo pulse for indicating the failure of an echo pulse following a firing pulse.

8. Apparatus as defined in claim 7 further including means responsive to said error indicating means for interrupting the readout means to stop further readout of information from the memory means.

9. Apparatus as defined in claim 8 further including switch means associated with each dispensing unit for breaking the thyratron driving circuit in response to the dispensing of an item, whereby the thyratron is extinguished only if an item is dispensed by the associated dispensing unit, means for sensing a conductive condition of any one of the thyratrons, means responsive to said sensing means for inhibiting the counting of said counter when any of the thyratrons remain conductive at the completion of a periodic readout from the memory means, and shortage indicator means responsive to said sensing means for indicating failure of the apparatus to dispense a particular item.

10. Apparatus for automatically dispensing variable quantities of selected items during a dispensing operation, comprising a plurality of item dispensers each arranged to dispense a predetermined quantity of goods when actuated, memory means for storing quantity and item information in digitally coded form, means associated with the memory means for repeatedly sensing said information in the memory means and generating signals indicative of the digitally coded quantity and item information, counting means responsive to the sensing means for generating a signal indicative of the number of times said information has been sensed during a dispensing operation, means coupled to the sensing means and the counting means for comparing the signal indicative of the number of times the stored information is sensed with the signals indicative of the quantity and item information, the comparing means generating a separate signal for each item in which the quantity exceeds the number of times the stored information is sensed, and means responsive to the signals from the comparing means for actuating the item dispensers.

11. Order dispensing apparatus comprising means for storing in digitally coded form a plurality of signals indicative of the items and quantity required of each item in the order, means coupled to the storing means for repeatedly sensing and reproducing all of said signals in each of successive cycles, counting means responsive to the sensing means for generating a signal indicative of the number of successive cycles in which the signals in the storage means have been reproduced by the sensing means, and means responsive to each of the signals reproduced by the sensing means and the counting means for dispensing during each successive sensing cycle one of all items in which the quantity required exceeds the number of previous sensing cycles.

12. Apparatus for dispensing any quantity of selected items comprising a source of digitally coded signals indicative of the type and quantity or each item to be dispensed, a plurality of dispensing units, each arranged to dispense one item when actuated, decoding means coupled to the source for generating a plurality of output signals identifying the items to be dispensed, means responsive to the output signals from the decoding means for actuating the particular dispensing units identified by said output signals, counting means responsive to said actuating means for generating a signal indicative of the number of times the dispensing units have been actuated, and means responsive to the signal from the counting means and the quantity indicating signals from said source for blocking the actuation of any dispensing unit when the quantity information for that unit is equal to the number of times the units have been actuated.

13. Apparatus for dispensing any quantity of selected items comprising a source of digitally coded signals identifying the type and quantity of each item to be dispensed, a plurality of dispensing units, each unit being arranged to dispense one item when actuated, decoding means coupled to the source for generating a plurality of output signals identifying the items to be dispensed, means responsive to said output signals from the decoding means for actuating all the particular dispensing units identified by said output signals, means responsive to the coded item information in the source for actuating selected dispensing units to dispense one of each identified item, means for recycling the actuating means to dispense additional ones of the identified items, and means responsive to the coded quantity information in the source for selectively interrupting the actuation of any dispensing unit during the recycling of the actuating means when the correct quantity of that item has been dispensed.

14. Apparatus for dispensing any quantity of selected items comprising a source of digitally coded signals indicative of the type and quantity of each item to be dispensed, a plurality of dispensing units, each arranged to dispense one item when actuated, first decoding means coupled to the source for generating a plurality of output signals identifying the items to be dispensed, means responsive to said output signals from the decoding means for repeatedly actuating all the particular dispensing units identified by said output signals, second decoding means coupled to the source for generating a plurality of output signals indicative of the quantity of each item to be dispensed, means responsive to the signals from the second decoding means for interrupting the actuation of any particular dispensing unit by said actuating means when the particular dispensing unit has been actuated a number of times corresponding to the quantity information for that particular item.

References Cited in the file of this patent

UNITED STATES PATENTS

| | | |
|---|---|---|
| 2,353,002 | Armbruster | July 4, 1944 |
| 2,374,537 | Goldsmith | Apr. 24, 1945 |
| 2,626,575 | Whitsel | Jan. 27, 1953 |
| 2,888,197 | Winn | May 26, 1959 |

UNITED STATES PATENT OFFICE
CERTIFICATE OF CORRECTION

Patent No. 3,144,958

August 18, 1964

Donald G. Gumpertz

It is hereby certified that error appears in the above numbered patent requiring correction and that the said Letters Patent should read as corrected below.

Column 4, line 51, for "FIG. 13" read -- FIG. 3 --; column 5, line 10, after "collector" insert -- conveyer --; column 10, line 28, for "extends" read -- exceeds --; line 35, for "the", second occurrence, read -- that --; line 43, for "grating" read -- gating --; column 11, line 65, for "120" read -- 129 --.

Signed and sealed this 12th day of January 1965.

(SEAL)
Attest:

ERNEST W. SWIDER
Attesting Officer

EDWARD J. BRENNER
Commissioner of Patents